United States Patent
Park et al.

(10) Patent No.: US 9,664,942 B2
(45) Date of Patent: May 30, 2017

(54) LIQUID CRYSTAL DISPLAY

(71) Applicant: Samsung Display Co., Ltd., Yongin, Gyeonggi-Do (KR)

(72) Inventors: Dae Youn Park, Yongin (KR); Sang Hun Lee, Yongin (KR); Min Jung Kang, Yongin (KR); Chang Hun Kwak, Yongin (KR); Young Bong Cho, Yongin (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/807,685

(22) Filed: Jul. 23, 2015

(65) Prior Publication Data

US 2016/0124263 A1    May 5, 2016

(30) Foreign Application Priority Data

Oct. 31, 2014 (KR) ........................ 10-2014-0150311

(51) Int. Cl.
*G02F 1/1335* (2006.01)
*G02F 1/1339* (2006.01)
*G02F 1/1337* (2006.01)
*G02F 1/1343* (2006.01)
*G02F 1/1362* (2006.01)

(52) U.S. Cl.
CPC .... *G02F 1/133512* (2013.01); *G02F 1/13394* (2013.01); *G02F 1/133707* (2013.01); *G02F 2001/134345* (2013.01); *G02F 2001/136222* (2013.01)

(58) Field of Classification Search
None
See application file for complete search history.

(56) References Cited

U.S. PATENT DOCUMENTS

| 2008/0068537 A1* | 3/2008 | Lee | G02F 1/136209 349/106 |
| 2011/0001909 A1* | 1/2011 | Tseng | G02F 1/136209 349/106 |
| 2013/0009176 A1 | 1/2013 | Kang et al. | |
| 2014/0111727 A1* | 4/2014 | Kimura | G02F 1/134363 349/43 |

FOREIGN PATENT DOCUMENTS

KR   10-2013-0003357   1/2013

* cited by examiner

*Primary Examiner* — Phu Vu
(74) *Attorney, Agent, or Firm* — Innovation Counsel LLP

(57) ABSTRACT

Provided is a liquid crystal display, including a first substrate including a plurality of pixel regions including a transmissive light area and a non-transmissive light area, a second substrate facing the first substrate and a liquid crystal layer disposed between the first substrate and the second substrate, wherein the pixel regions includes color filters disposed on a base substrate, a pixel electrode disposed on each of the color filters at the transmissive light area and a black column spacer at a region except a region corresponding to the transmissive light area, wherein the each of the color filters has substantially rectangular shape with a long side and a short side, and wherein the long side has a recess portion in which a part of a long side corresponding to the non-transmissive light area is removed.

19 Claims, 5 Drawing Sheets

LIQUID CRYSTAL DISPLAY

CROSS-REFERENCE TO RELATED APPLICATION

This application claims priority to and the benefit of Korean Patent Application No. 10-2014-0150311, filed on Oct. 31, 2014, in the Korean Intellectual Property Office, the entire content of which is incorporated herein by reference in its entirety.

BACKGROUND

1. Field

Embodiments relate to a liquid crystal display, and more particularly, to a liquid crystal display with enhanced display qualities.

2. Description of the Related Art

Generally, a liquid crystal display may include an array substrate, a facing substrate facing the array substrate and a liquid crystal layer between the array substrate and the facing substrate. The liquid crystal display may include a color filter for implementing images in color. Recently, liquid crystal displays include color filter on array (COA) substrate, that is, a structure where the color filter is provided on the array substrate.

Also, to prevent a misalignment from occurring in a process coupling the facing substrate where the COA substrate and a light blocking member are formed to the array substrate, research is being conducted on a black matrix on array (BOA) substrate that forms the light blocking member on the COA substrate. Also, a black column spacer BCS that forms a black matrix that blocks light and a column spacer that maintains a cell gap at the same time using the same material is being developed.

The black column spacer may include a light blocking portion and a cell gap retaining portion. The light blocking portion may block light, and the cell-gap retaining portion may maintain a cell gap of the liquid crystal display.

Meanwhile, the light blocking portion may be provided at a region of the liquid crystal display where light does not penetrate, that is, a non-transmissive light area. A part of the light blocking portion may be provided on a region where adjacent color filters overlap. The light blocking portion on the region where the color filters overlap may have a height higher than the other portion. Accordingly, a height difference between the light blocking portion of the region where the color filters overlap and the cell gap retaining portion may decrease.

The decrease in height difference between the light blocking portion and the cell gap retaining portion may cause active unfilled area (AUA) defects. Also, the cell gap of a liquid crystal cell may become non-uniform. Consequently, a problem of stain on the screen may arise.

SUMMARY

Embodiments may be realized by providing a liquid crystal display, including a first substrate including a plurality of pixel regions including a transmissive light area and a non-transmissive light area, a second substrate facing the first substrate, and a liquid crystal layer disposed between the first substrate and the second substrate, wherein the pixel regions includes color filters disposed on a base substrate at the pixel regions, a pixel electrode disposed on each of the color filters at the transmissive light area, and a black column spacer disposed at a region except a region corresponding to the transmissive light area, wherein the each of the color filters has a substantially rectangular shape with a long side and a short side, and wherein the long side has a recess portion in which a part of a long side corresponding to the non-transmissive light area is removed.

Adjacent color filters may at a region between adjacent transmissive light areas but do not overlap at a region where the recess portion is formed.

The black column spacer may include a light blocking portion surrounding the transmissive light area, and a cell gap retaining portion disposed at the non-transmissive light area and maintaining a distance between the first substrate and the second substrate.

The light blocking portion disposed at a region where the adjacent color filters overlap each other may be protruded in a direction of the second substrate due to the overlapping of the color filters.

The pixel electrode may include a hexagon-shaped first pixel electrode provided on the color filter and including a rhombus-shaped open portion at a center, a protective layer covering the first pixel electrode, and a second pixel electrode disposed on the protective layer, wherein the second pixel electrode may include a first sub-pixel electrode overlapping the open portion of the first pixel electrode, and a second sub-pixel electrode surrounding the first sub-pixel electrode and spaced apart from the first sub-pixel electrode.

The first sub-pixel electrode may include a cross-shaped stem and a plurality of first branch portions extending from the stem portion, and the second sub-pixel electrode may include a peripheral portion having a substantially rectangular shape and a plurality of second branch portions extending from the peripheral portion.

According to an embodiment, a liquid crystal display may include a first substrate including a plurality of pixel regions divided into a transmissive light area and a non-transmissive light area, a second substrate facing the first substrate and a liquid crystal layer disposed between the first substrate and the second substrate, wherein the first substrate may include a gate line disposed on the first base substrate, a data line crossing the gate line by being insulated from the gate line, a plurality of thin film transistors coupling to the gate line and the data line and disposed at the non-transmissive light area, a first protective layer covering the thin film transistors, color filters disposed on the first protective layer at the pixel regions, a first pixel electrode disposed on each of the color filters and coupling to one of the thin film transistors, a second protective layer covering the first pixel electrode, a second pixel electrode provided on the second protective layer and coupling to another one of the thin film transistors and a black column spacer disposed at a region except a region corresponding to the transmissive light area, wherein the color filters are quadrilateral-shaped with a long vertical side and a chamfer-shaped part of a long side corresponding to an adjacent color filter at the non-transmissive light area.

The adjacent color filters may overlap at a region between adjacent transmissive light regions and do not overlap at a region where the recessed portion is formed.

The black column spacer may include a light blocking portion surrounding the transmissive light area, and a cell gap retaining portion disposed at the non-transmissive light area and maintaining a distance between the first substrate and the second substrate.

The light blocking portion disposed at a region where the adjacent color filters overlap may protrude in a direction of the second substrate due to the overlapping of the color filters.

A third protective layer may be further included disposed between the color filter and the first pixel electrode.

The first pixel electrode may be hexagon-shaped and may include a rhombus-shaped open portion at a center, and the second pixel electrode may include a first sub-pixel electrode overlapping the open portion of the first pixel electrode and a second sub-pixel electrode, spaced apart from the first pixel electrode and surrounding of the first sub-pixel electrode.

The first sub-pixel electrode may include a cross-shaped stem portion and a plurality of first branch portions extending from the stem portion, and the second sub-pixel electrode may include a peripheral portion having a substantially rectangular shape and a plurality of second branch portions extending from the peripheral portion.

Embodiments may be realized by providing a liquid crystal display, including a first substrate including a plurality of pixel regions including a transmissive light area and a non-transmissive light area, the pixel regions including adjacent subpixel regions, a second substrate facing the first substrate, and a liquid crystal layer disposed between the first substrate and the second substrate, wherein the pixel regions includes color filters disposed on a base substrate, a pixel electrode disposed on each of the color filters at the transmissive light area, and a black column spacer disposed at a region except a region corresponding to the transmissive light area, wherein an overlap length of adjacent color filters at a region corresponding to the transmissive light areas is longer than that in the non-transmissive light area.

Each of the color filters may have a recess portion at a region corresponding to the non-transmissive light area.

The adjacent color filters at a region corresponding to the non-transmissive light area may not overlap.

The recess portion may have a trapezoidal shape in which a long base is closer to the pixel edge than a short base. The long base and the short base may be substantially parallel to the pixel edge.

BRIEF DESCRIPTION OF THE DRAWINGS

Example embodiments will now be described more fully hereinafter with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout this specification.

DETAILED DESCRIPTION

Figure 1:
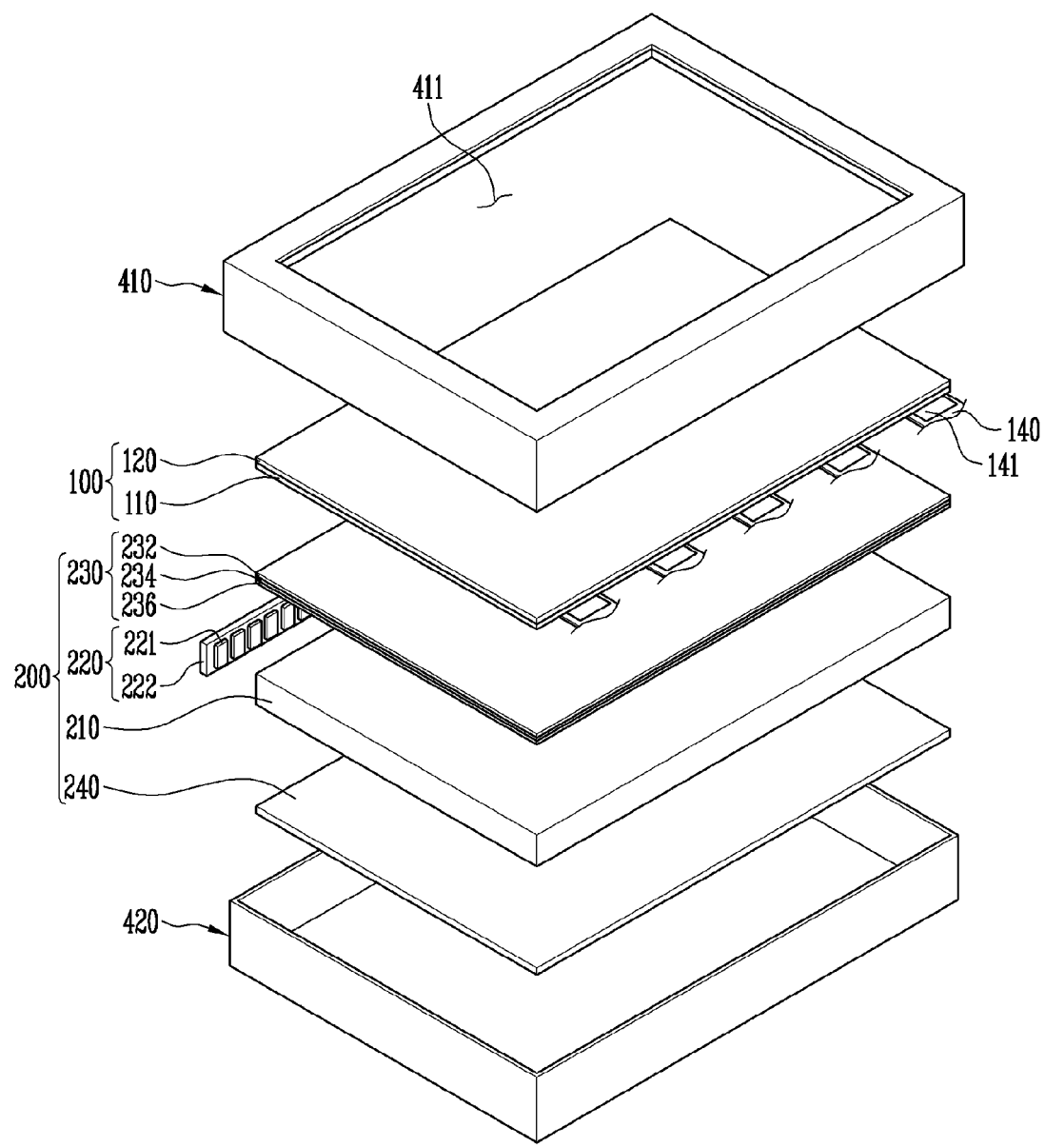
FIG. 1 is an exploded perspective view illustrating a liquid crystal display according to an embodiment.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. In addition, it will be understood that when an element or layer is referred to as being "on", "connected to" or "coupled to" another element or layer, it can be directly on, connected or coupled to the other element or layer or intervening elements or layers may be present between the element or layer and the another element or layer. In contrast, when an element is referred to as being "directly on," "directly connected to" or "directly coupled to" another element or layer, there are no intervening elements or layers present between the element or layer and the another element or layer. Like numbers refer to like elements throughout the specification. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exploded perspective view illustrating a liquid crystal display according to an embodiment.

Referring to FIG. 1, a liquid crystal display may include a liquid crystal display panel 100, a backlight unit 200, an upper cover 410 and a lower cover 420.

The liquid crystal display panel 100 may have a rectangular plate shape with long and short sides. The liquid crystal display panel 100 may have a display region for displaying images and a non-display region around the display region. Also, the liquid crystal display panel 100 may include a first substrate 110, a second substrate 120 facing the first substrate 110 and a liquid crystal layer (not shown) between the first substrate 110 and the second substrate 120. Also, polarizing film (not shown) may be attached on both sides of the liquid crystal display panel 100, i.e., on outer surfaces of the first substrate 110 and the second substrate 120.

A plurality of pixels (not shown) arranged in a matrix may be provided on the first substrate 110. Each pixel may include a plurality of subpixels. Each subpixel may have a different color. For example, each subpixel may have one of red, green, blue, cyan, magenta or yellow colors. Accordingly, light emitted from each subpixel may have one of the red, green, blue, cyan, magenta or yellow colors. Also, each of the subpixels may include a gate line (not shown), a data line DL (not shown) crossing the gate line such that the data line DL may be insulated from the gate line, and a pixel electrode (not shown). Also, each subpixel may include a thin film transistor (not shown) electrically coupled to the gate line and the data line DL electrically coupled corresponding to the pixel electrode. The thin film transistor may switch a driving signal supplied to the corresponding pixel electrode.

In the non-display region of the first substrate 110, a sealing layer (not shown) that attaches the first substrate 110 and the second substrate 120 together may be provided.

The second substrate 120 may include a common electrode (not shown) facing the pixel electrode (not shown).

The liquid crystal layer may be arranged in a predetermined direction due to a voltage applied to the pixel electrode and the common electrode in common. The liquid crystal layer may display an image of the liquid crystal display panel 100 by adjusting transmittance of the light supplied from the backlight unit 200.

Meanwhile, in the non-display region, a signal input pad (not shown) may be arranged on an outside surface of any one of the first substrate 110 or the second substrate 120. The signal input pad may be coupled to a flexible circuit board 140 with a driver IC 11 mounted thereon, and the flexible circuit board 140 may be coupled to an outside circuit module (not shown). The driver IC 141 may receive control signals input from the outside circuit module, and in response to the control signals, the driver IC 141 may output a driving signal to the thin film transistor.

The backlight unit 200 may be disposed on a direction opposite to a light emitting direction of the liquid crystal display panel 100. The backlight unit 200 may include a light guide plate 210, a light source unit 220 including a plurality of light sources, an optical member 230 and a reflection sheet 240.

The light guide plate 210 may be provided on a lower part of the liquid crystal display panel 100. The light guide plate 210 may emit the light in a direction of the liquid crystal display panel 100 by guiding the light that is emitted from the light source unit 220. Particularly, the light guide plate 210 may overlap the display region of the liquid crystal display panel 100 at least. The light guide plate 210 may include an emission surface that emits the light, a lower surface facing the emission surface, and side surfaces coupling the emission surface and the lower surface. Also, at least any one of the side surfaces may face the light source unit 220 and may be an incident surface to which light released from the light source unit 220 is incident on, and a side surface that faces the incident surface may be a reflective surface that reflects the light.

The light source unit 220 may have a plurality of light sources 221, for example, a plurality of light-emitting diodes are mounted on a printed circuit board 222.

Here, the light sources 221 may emit light having the same colors. For example, the light sources 221 may emit a white light.

Also, the light sources 221 may emit light having different colors. For example, a portion of the light sources 221 may release a red light, another portion of the light sources 221 may release a green light, and remaining may release a blue light.

The light source unit 220 may be disposed to face any one of side surfaces of the light guide plate 210. As a result, the light that is used to display an image by the liquid crystal display panel 100 may be provided through the light guide plate 210.

The optical member 230 may be provided between the light guide plate 210 and the liquid crystal display panel 100. The optical member 230 may adjust the light that is provided from the light source unit 220 and that is emitted through the light guide plate 210. Also, the optical member 230 may include a diffusion sheet 236, a prism sheet 234 and a protective sheet 232, the diffusion sheet 236, the prism sheet 234 and the protective sheet 232 being sequentially stacked.

The diffusion sheet 236 may diffuse the light that is emitted from the light guide plate 210. The prism sheet 234 may concentrate light that is diffused from the diffusion sheet 236 in a direction that is vertical to a surface of a liquid crystal display panel 100. The light that passes through the prism sheet 234, in most cases, may be incident on the liquid crystal display panel 100 vertically. The protective sheet 232 may be located on the prism sheet 234. The protective sheet 232 may protect the prism sheet 234 from an external impact.

In an embodiment, the optical member 230 is described as including the diffusion sheets 236, the prism sheets 235 and the protective sheets 232, but the present inventive concept is not limited thereto. The optical member 230 may include at least any one of the diffusion sheet 236, the prism sheet 234 and the protective sheet 232, and may include a plurality of sheets stacked one over another. Depending on a need, any one of the sheets may be omitted.

The reflection sheet 240 may be provided on a lower part of the light guide plate 210. The reflection sheet 240 may reflect the light that does not have an emitting direction toward the liquid crystal display panel 100 among the light emitted from the light source unit 220. The reflection sheet 240 may include a material that reflects light. The reflection sheet 240 may be located on the lower cover 420 and reflect the light generated from the light source unit 220. As a result, the reflection sheet 240 may increase the amount of the light provided to the liquid crystal display panel 100.

In an embodiment, the example of the light source unit 220 is arranged to provide light in a direction towards a side surface of the light guide plate 210, however, the present inventive concept is not limited thereto. For example, the light source unit 220 may be arranged to provide light in a direction towards a lower surface of the light guide plate 210. Also, the light guide plate 210 may be omitted from the backlight unit 200, and the light source unit 220 may be provided on a lower part of the liquid crystal display panel 100. The light source unit 220 may emit light that is directly provided to the liquid crystal display panel 100.

The upper cover 410 may be provided on an upper part of the liquid crystal display panel 100. The upper cover 410 may include a display window 411 that exposes the display region of the liquid crystal display panel 100. The upper cover 410 may support a front edge of the liquid crystal display panel 100 by being coupled to the lower cover 420.

The lower cover 420 may be provided on a lower part of the backlight unit 200. The lower cover 420 may include a space that can accommodate the liquid crystal display panel 100 and the backlight unit 200. Also, the lower cover 420 may receive and support the liquid crystal display panel 100 and the backlight unit 200 in an inner space by being coupled to the upper cover 410.

Figure 2:
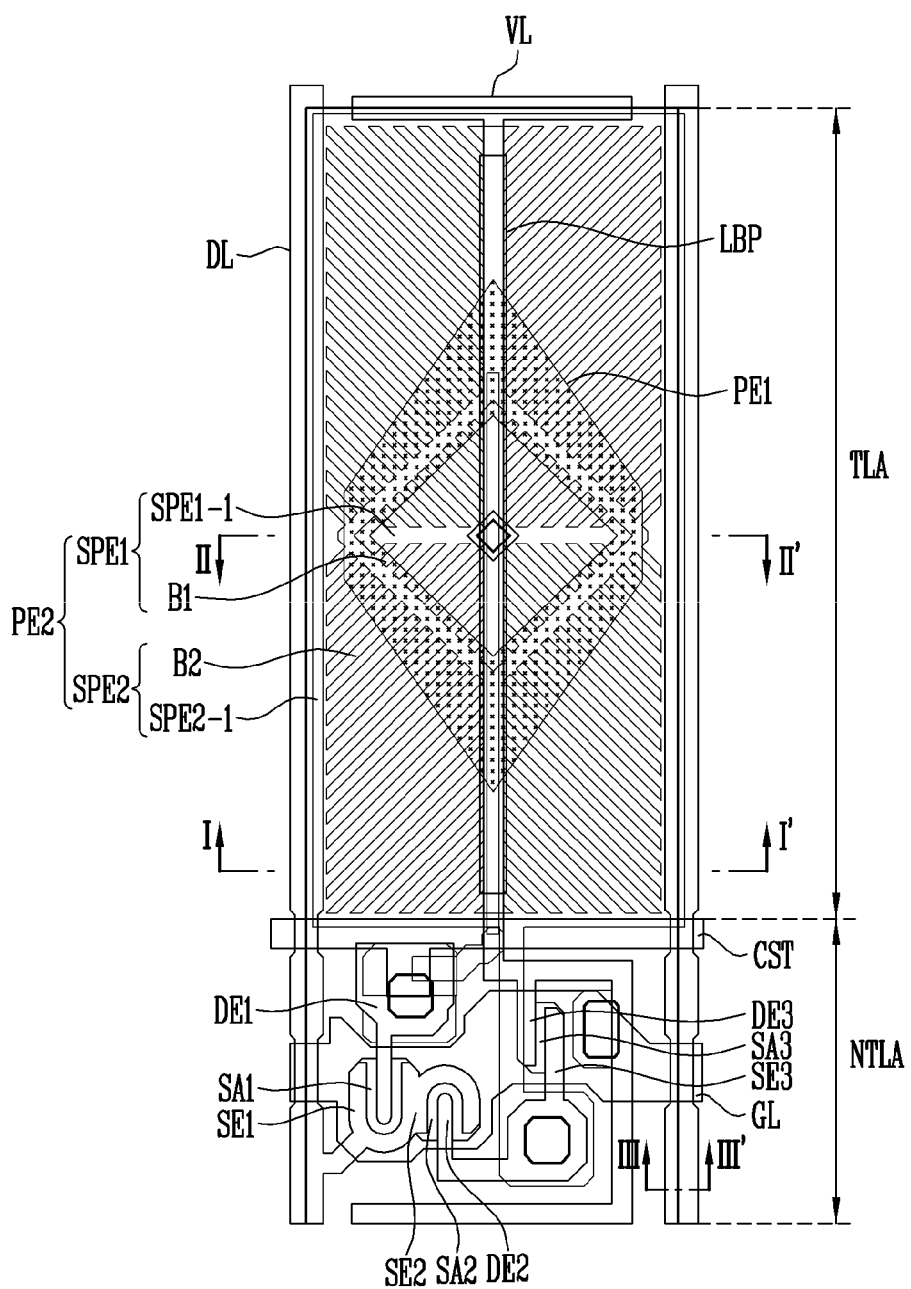
FIG. 2 is a plane view illustrating one pixel of a liquid crystal display panel shown in FIG. 1.
Figure 3:
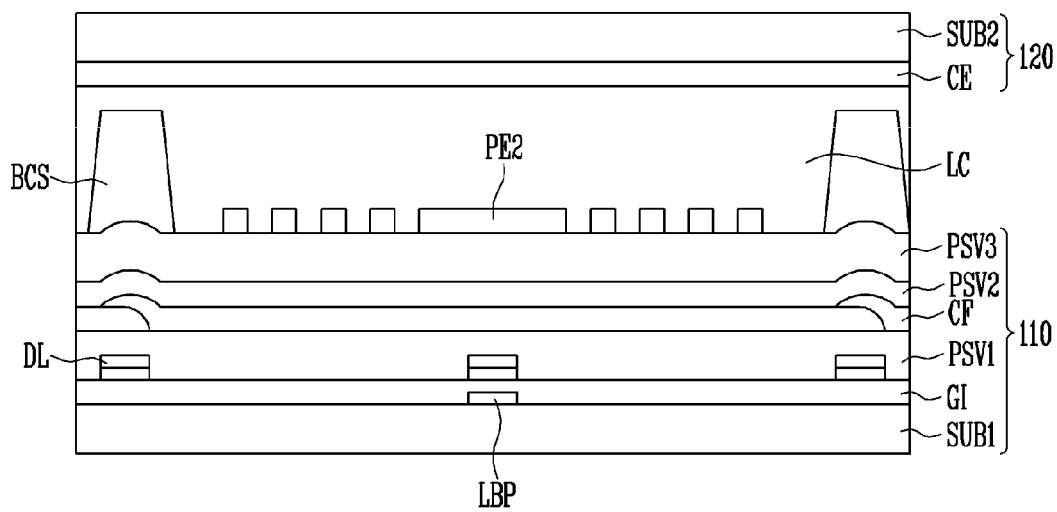
FIG. 3 is a cross-sectional view along a I-I' line of FIG. 2.
Figure 4:
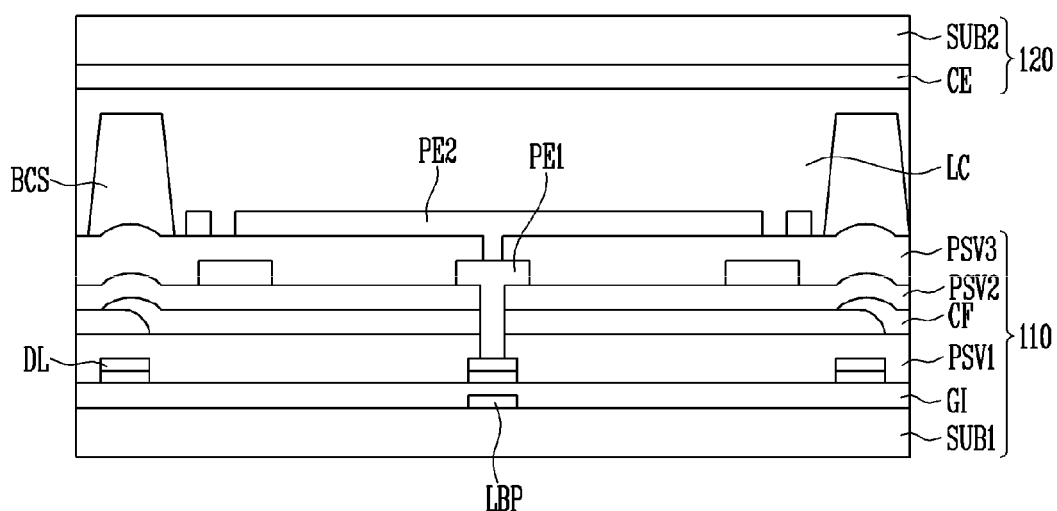
FIG. 4 is a cross sectional view along a II-II' line of FIG. 2.
Figure 5:
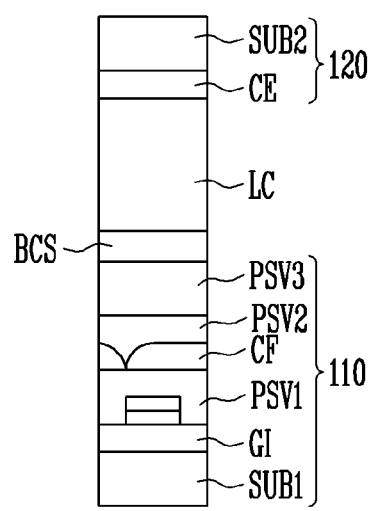
FIG. 5 is a cross sectional view along a III-III' line of FIG. 2.
Figure 6:
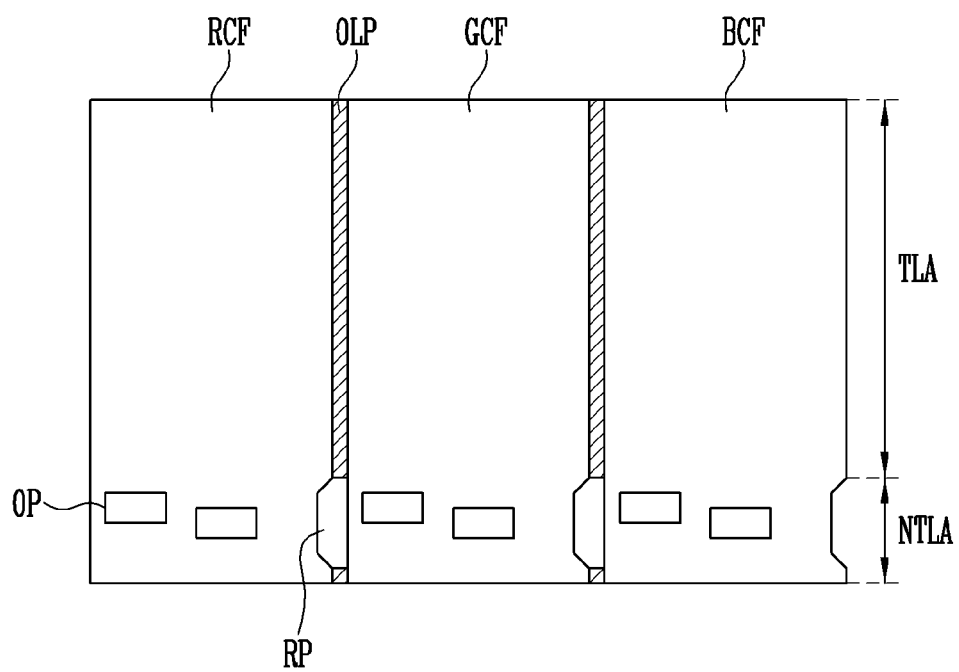
FIG. 6 is a plane view for illustrating a layout of color filters.
Figure 7:
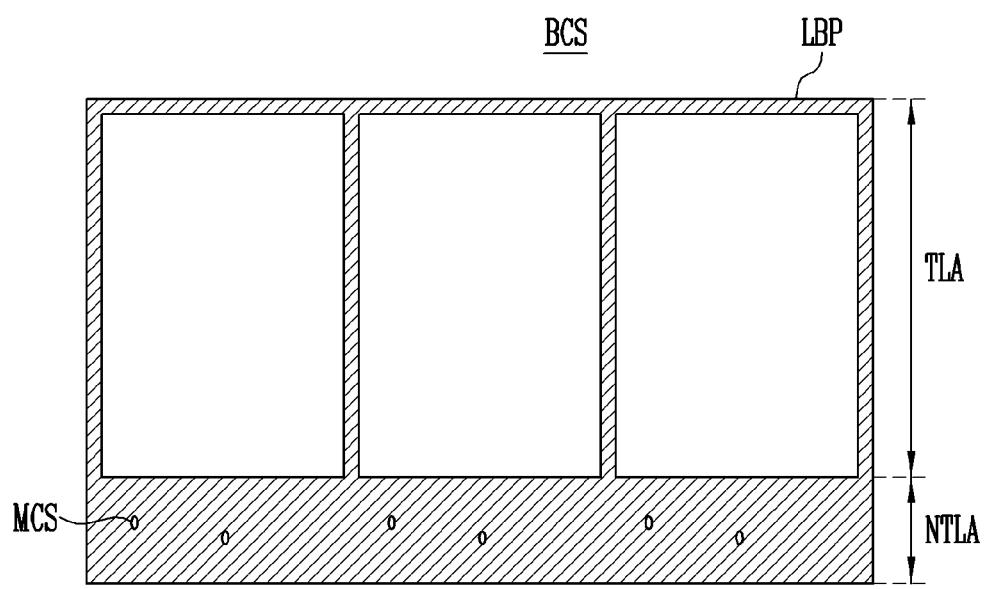
FIG. 7 is a plane view for illustrating a form of a light shield maintenance member.

FIG. 2 is a plane view illustrating one pixel of a liquid crystal display panel shown in FIG. 1. FIG. 3 is a cross-sectional view along a I-I' line of FIG. 2. FIG. 4 is a cross sectional view along a II-II' line of FIG. 2. FIG. 5 is a cross sectional view along a III-III' line of FIG. 2. FIG. 6 is a plane view for illustrating a layout of color filters. FIG. 7 is a plane view for illustrating a form of a light shield maintenance member.

Referring to FIGS. 2 to 7, a liquid crystal display panel may include a first substrate 110, a second substrate 120 facing the first substrate 110 and a liquid crystal layer LC between the first substrate 110 and the second substrate 120.

The first substrate 110 may be a thin film transistor array substrate with thin film transistors formed thereon in order to drive liquid crystal molecules of the liquid crystal layer LC.

The first substrate 110 may include a first base substrate SUB1 having a plurality of pixel regions. The pixel regions may include a transmissive light area TLA that allows light to pass through and a non-transmissive light area NTLA that does not allow light to pass through.

The first base substrate SUB1 may be a base substrate of a rigid or a flexible type. The base substrate of the rigid type may be one of a glass base substrate, a quartz base substrate, a glass ceramic base substrate or a crystalline structure glass base substrate. The base substrate of the flexible type may be one of a film base substrate that includes an organic polymer or a plastic base substrate. The material applied to the first base substrate SUB1 may have a resistance (or a heat resistance) to a high process temperature at the time of manufacture.

A gate line GL may be provided on the first base substrate SUB1 of the non-transmissive light area NTLA. The gate line GL may transmit a gate signal and extend in a first direction. A part of the gate line GL may be a first, second, or third gate electrode (not shown).

A light blocking pattern LBP extending in a second direction may be provided on the first base substrate SUB1 of the transmissive light area TLA. The second direction may be a direction that crosses the first direction. The light blocking pattern LBP may have a same material as the gate line GL. The light blocking pattern LBP may be electrically insulated from the gate line GL.

A gate insulating layer GI may be provided on the gate line GL and the light blocking pattern LBP. The gate insulating layer GI may include at least one of a silicon oxide SiOx or a silicon nitride SiNx.

First to third semiconductor layers SA1, SA2 and SA3 may be provided on the gate insulating layer GI of the non-transmissive light area NTLA. Meanwhile, although not shown in the drawings, an ohmic contact layer may be provided on surfaces of the first to third semiconductor layers SA1, SA2 and SA3.

A data line DL, a reference voltage line VL, first to third source electrodes SE1, SE2 and SE3 and first to third drain electrodes DE1, DE2 and DE3 may be provided on the gate insulating layer GI and the first to third semiconductor layers SA1, SA2 and SA3.

The data line DL may extend in the second direction from one side of each of the pixel regions and may be coupled to an external driving circuit.

The reference voltage line VL may extend in the second direction and may overlap the light blocking pattern LBP.

A first protective layer PSV1 may be formed on the data line DL, the reference voltage line VL, the first to third source electrodes SE1, SE2 and SE3 and the first to third drain electrodes DE1, DE2 and DE3. The first protective layer PSV1 may include at least one of the silicon oxide SiOx or the silicon nitride SiNx.

A color filter CF may be provided on the first protective layer PSV1. The color filter CF may include an organic material and may have a flat surface. The color filter CF may have one of red, green or blue colors, but the present inventive concept is not limited hereto. For example, the color filter CF may have one of cyan, magenta or yellow colors.

The color filter CF may be provided corresponding to each of the subpixel regions. For example, a red color filter RCF, a green color filter GCF and a blue color filter BCF may be sequentially provided at a red subpixel region, a green sub pixel region and a blue sub pixel region.

The color filters CF may have a substantially rectangular shape with a long side and short side. The color filters CF may have a recessed portion in which a part of a long side corresponding to the non-transmissive light area NTLA may be removed. That is, the shape may be such that the part of the long side may be recessed in a direction going away from the adjacent color filter CF from one side.

Thus, an overlap length of adjacent color filters at a region corresponding to the transmissive light areas TLA is longer than that in the non-transmissive light area NTLA. At an recess portion RP corresponding to the non-transmissive light area NTLA where the color filter is chamfered or trimmed, the adjacent color filters CF may not overlap each other. The color filter may have open portions OP. The pixel electrode may be connected to respective drain electrode through the open portions.

Therefore, surface texturing due to the overlapping of the color filters CF on the non-transmissive light area NTLA may decrease. Particularly, a region where the adjacent color filters CF do not overlap, that is, a surface of the recess portion RP where the chamfered or trimmed shape is provided may not have a step portion. The recess portion RP may have a trapezoidal shape in which a long base is closer to the pixel edge than a short base. The long base and the short base may be substantially parallel to the pixel edge.

A second protective layer PSV2 may be provided on the color filter CF. The second protective layer PSV2 may prevent the color filter CF from being exposed. The second protective layer PSV2 may include a same material as the first protective layer PSV1. That is, the second protective layer PSV2 may include at least one of the silicon oxide SiOx or the silicon nitride SiNx.

A first pixel electrode PE1 may be provided on the second protective layer PSV2 of the transmissive light area TLA. The first pixel electrode PE1 may include a transparent conductive oxide. The transparent conductive oxide may be one of indium tin oxide (ITO), indium zinc oxide (IZO), aluminum zinc oxide (AZO), gallium doped zinc oxide (GZO), zinc tin oxide (ZTO), gallium tin oxide (GTO) or fluorine doped tin oxide (FTO).

The first pixel electrode PE1 may be coupled to the first drain electrode DE via contact holes that pass through the first protective layer PSV1, the color filter layer CF and the second protective layer PSV2.

The first pixel electrode PE1 may have a hexagonal shape. In more detail, the first pixel electrode PE1 may have six sides. That is, the first pixel electrode PE1 may include a first side and a second side parallel to one side of the pixel region, a third side and a fourth side extending from one side of the first side and the second side, tilted with respect to the first side and the second side and parallel to each other, and a fifth side and a sixth side coupling the first and second sides to the third and fourth sides and parallel to each other. In an embodiment, lengths of the first to sixth sides may be the same.

The first pixel electrode PE1 may have an open portion having a rhombus shape at a center and a coupling portion crossing the open portion. The coupling portion may overlap the reference voltage line VL.

A third protective layer PSV3 may be provided on the first pixel electrode PE1. That is, the third protective layer PSV3 may cover the first pixel electrode PE1. Also, the third protective layer PSV3 may include a same material as the first protective layer PSV1. That is, the third protective layer PSV3 may include at least one of silicon oxide SiOx or silicon nitride SiNx.

A second pixel electrode PE2 may be provided on the third protective layer PSV3 of the transmissive light region TLA. The second pixel electrode PE2 may include a same material as the first pixel electrode PE1.

Also, the second pixel electrode PE2 may have a plate shape and may cover most of the pixel region. The second pixel electrode PE2 may include a first sub-pixel electrode SPE1 having a rhombus shape and a second sub-pixel electrode SPE2 surrounding the first sub-pixel electrode SPE1. The first sub-pixel electrode SPE1 and the second sub-pixel electrode SPE2 may be spaced apart from each other.

An edge region of the first sub-pixel electrode SPE1 may overlap the first pixel electrode PE1. The first sub-pixel electrode SPE1 may include a cross-shaped stem portion SPE1-1 including a horizontal stem portion and a vertical stem portion and a plurality of first branch portions B1 extending from the stem portion SPE1-1. Also, the first sub-pixel electrode SPE1 may be coupled to the first pixel electrode PE1 via a contact hole passing through the third protective layer PSV3.

The first sub-pixel electrode SPE1 may be divided into four sub-regions by the cross-shaped stem portion SPE1-1. Also, the first branch portions B1 may be provided at the sub-regions. An angle that the first branch portions B1 may form with the stem portion SPE1-1 may be approximately 35 degrees to 55 degrees.

An inner edge region of the second sub-pixel electrode SPE2 may overlap the first pixel electrode PE1. The second sub-pixel electrode SPE2 may be spaced apart from the first sub-pixel electrode SPE1 and may surround the first sub-pixel electrode SPE1. The second sub-pixel electrode SPE2 may be coupled to the second drain electrode DE2 via the contact hole passing through the first protective layer PSV1, the color filter layer CF, the second protective layer PSV2 and the third protective layer PSV3.

Also, the second sub-pixel electrode SPE2 may include a peripheral portion SPE2-1 having a substantially rectangular shape and a plurality of second branch portions B2 extending from the peripheral portion SPE2-1. The angle that the second branch portions B2 form with the peripheral portion SPE2-1 may be approximately 35 degrees to 55 degrees.

A black column spacer BCS may be provided at regions other than the transmissive light region of the third protective layer PSV3. The black column spacer BCS may be provided on the third protective layer PSV3 of the region between the non-transmissive region NTLA and the adjacent pixel regions.

The black column spacer BCS may include a light blocking portion that blocks light and surrounding the transmissive light area, and a cell gap retaining portion MCS that maintains a space between the first substrate 110 and the second substrate 120 and disposed at the non-transmissive light area. The light blocking portion LBP may block light by being provided between the adjacent transmissive light areas.

The light blocking portion LBP provided on an upper part of an overlapping region OLP where the adjacent color filters CF overlap may maintain a space between the first substrate 110 and the second substrate 120 as in the case of the cell gap retaining portion MCS. The region that the adjacent color filters CF overlap each other has an elevated top surface as compared to the other region, and, as a result, the light blocking portion LBP may maintain the cell gap.

Meanwhile, the light blocking portion LBP that corresponds to the recess portion RP where a chamfered or trimmed shape is provided among the light blocking portion LBP may not have an elevated surface. Consequently, a height difference between the light blocking portion LBP and the cell gap retaining portion MCS may be maximized. As a result, AUA defects may be prevented at the recess portion RP where the chamfered or trimmed shape is provided.

The cell gap retaining portion MCS may be provided at a part of the non-transmissive light area NTLA and may have an elevated surface that contacts the second substrate. The cell gap retaining portion MCS may maintain a space between the first substrate 110 and the second substrate 120.

The second substrate 120 may be a facing substrate facing the first substrate 110. The second substrate 120 may include a second base substrate SUB2 and a common electrode CE.

The second base substrate SUB2 may include the same material as the first base substrate SUB1.

The common electrode CE may be provided on the second base substrate SUB2. The common electrode CE may have a plate shape at the pixel region.

The common electrode CE may include the same material as the first pixel electrode PE1 and the second pixel electrode PE2. That is, the common electrode CE may include the transparent conductive oxide.

An over coat layer (not shown) may be provided between the second base substrate SUB2 and the common electrode CE. The over coat layer may be disposed on a side in a direction facing the first substrate 110 of the second base substrate SUB2. The over coat layer may flatten a surface of the second base substrate SUB2.

The liquid crystal layer LC may include a plurality of liquid crystal molecules having a dielectric anisotropy. The liquid crystal molecules may be provided between the first substrate 110 and the second substrate 120. For example, the liquid crystal molecules may be vertically oriented liquid crystal molecules arranged in a direction vertical to the two substrates 110 and 120 between the first substrate 110 and the second substrate 120. If an electric field is applied between the first substrate 110 and the second substrate 120, the liquid crystal molecules may allow light to pass through or block the light by rotating in a predetermined direction between the first substrate 110 and the second substrate 120. Here, the term rotation refers to the liquid crystal molecules lie down in a direction parallel to the first substrate 110 or the second substrate 120. It may also mean that the liquid crystal molecules change the orientation by the electric field.

The liquid crystal display may improve qualities of display by preventing AUA defects.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present inventive concept as set forth in the following claims.

What is claimed is:

1. A liquid crystal display, comprising:
a first substrate including a plurality of pixel regions including a transmissive light area and a non-transmissive light area;
a second substrate facing the first substrate; and
a liquid crystal layer disposed between the first substrate and the second substrate,
wherein the pixel regions includes:
color filters disposed on a base substrate at the pixel regions;
a pixel electrode disposed on each of the color filters at the transmissive light area; and
a black column spacer disposed at a region except a region corresponding to the transmissive light area,
wherein the each of the color filters has a substantially rectangular shape with a long side and a short side, and
wherein the long side has a recess portion in which a part of a long side corresponding to the non-transmissive light area is removed, and
wherein color filters adjacent to each other overlap at a region between transmissive light areas adjacent to each other but do not overlap at a region where the recess portion is formed.

2. The liquid crystal display as claimed in claim 1, wherein the black column spacer comprises:
a light blocking portion surrounding the transmissive light area; and
a cell gap retaining portion disposed at the non-transmissive light area and maintaining a distance between the first substrate and the second substrate.

3. The liquid crystal display as claimed in claim 2, wherein the light blocking portion disposed at a region where the adjacent color filters overlap each other is protruded in a direction of the second substrate due to the overlapping of the color filters.

4. The liquid crystal display as claimed in claim 3, wherein the pixel electrode comprises:
a hexagon-shaped first pixel electrode provided on the color filter and including a rhombus-shaped open portion at a center;
a protective layer covering the first pixel electrode; and
a second pixel electrode disposed on the protective layer, wherein the second pixel electrode comprises:
a first sub-pixel electrode overlapping the open portion of the first pixel electrode; and
a second sub-pixel electrode surrounding the first sub-pixel electrode and spaced apart from the first sub-pixel electrode.

5. The liquid crystal display as claimed in claim 4, wherein the first sub-pixel electrode includes a cross-shaped stem and a plurality of first branch portions extending from the stem portion,
wherein the second sub-pixel electrode includes a peripheral portion having a substantially rectangular shape and a plurality of second branch portions extending from the peripheral portion.

6. A liquid crystal display, comprising:
a first substrate including a plurality of pixel regions divided into a transmissive light area and a non-transmissive light area;
a second substrate facing the first substrate; and
a liquid crystal layer disposed between the first substrate and the second substrate,
wherein the first substrate comprises:
a gate line disposed on the first base substrate;
a data line crossing the gate line by being insulated from the gate line;
a plurality of thin film transistors coupling to the gate line and the data line and disposed at the non-transmissive light area;
a first protective layer covering the thin film transistors;
color filters disposed on the first protective layer at the pixel regions;
a first pixel electrode disposed on each of the color filters and coupling to one of the thin film transistors;
a second protective layer covering the first pixel electrode;
a second pixel electrode provided on the second protective layer and coupling to another one of the thin film transistors; and
a black column spacer disposed at a region except a region corresponding to the transmissive light area,
wherein the each of the color filters has a substantially rectangular shape with a long side and a short side, and
wherein the long side has a recess portion in which a part of a long side corresponding to the non-transmissive light area is removed.

7. The liquid crystal display as claimed in claim 6, wherein adjacent color filters overlap at a region between adjacent transmissive light regions and do not overlap at a region where the recessed portion is formed.

8. The liquid crystal display as claimed in claim 7, wherein the black column spacer comprises:
a light blocking portion surrounding the transmissive light area; and
a cell gap retaining portion disposed at the non-transmissive light area and maintaining a distance between the first substrate and the second substrate.

9. The liquid crystal display as claimed in claim 8,
wherein the light blocking portion disposed at a region where the adjacent color filters overlap protrudes in a direction of the second substrate due to the overlapping of the color filters.

10. The liquid crystal display as claimed in claim 9, further comprising a third protective layer disposed between the color filter and the first pixel electrode.

11. The liquid crystal display as claimed in claim 10,
wherein the first pixel electrode is hexagon-shaped and includes a rhombus-shaped open portion at a center,
wherein the second pixel electrode includes a first sub-pixel electrode overlapping the open portion of the first pixel electrode and a second sub-pixel electrode spaced apart from the first pixel electrode and surrounding of the first sub-pixel electrode.

12. The liquid crystal display as claimed in claim 11,
wherein the first sub-pixel electrode includes a cross-shaped stem portion and a plurality of first branch portions extending from the stem portion,
wherein the second sub-pixel electrode includes a peripheral portion having a substantially rectangular shape and a plurality of second branch portions extending from the peripheral portion.

13. A liquid crystal display, comprising:
a first substrate including a plurality of pixel regions including a transmissive light area and a non-transmissive light area, the pixel regions including adjacent subpixel regions;
a second substrate facing the first substrate; and
a liquid crystal layer disposed between the first substrate and the second substrate,
wherein the pixel regions includes:
color filters disposed on a base substrate;
a pixel electrode disposed on each of the color filters at the transmissive light area; and
a black column spacer disposed at a region except a region corresponding to the transmissive light area,
wherein an overlap length of adjacent color filters at a region corresponding to the transmissive light areas is longer than that in the non-transmissive light area.

14. The liquid crystal display as claimed in claim 13,
wherein each of the color filters has a recess portion at a region corresponding to the non-transmissive light area.

15. The liquid crystal display as claimed in claim 14,
wherein the adjacent color filters at a region corresponding to the non-transmissive light area do not overlap.

16. The liquid crystal display as claimed in claim 15,
wherein the recess portion has a trapezoidal shape in which a long base is closer to the pixel edge than a short base.

17. The liquid crystal display as claimed in claim 15,
wherein the long base and the short base are substantially parallel to the pixel edge.

18. The liquid crystal display as claimed in claim 13,
wherein the recess portion has a trapezoidal shape in which a long base is closer to the pixel edge than a short base, and
wherein the long base and the short base are substantially parallel to the pixel edge.

19. The liquid crystal display as claimed in claim 13,
wherein the adjacent color filters at a region corresponding to the non-transmissive light area do not overlap.

\* \* \* \* \*